United States Patent [19]

Koechner

[11] Patent Number: 4,902,126

[45] Date of Patent: Feb. 20, 1990

[54] WIRE OBSTACLE AVOIDANCE SYSTEM FOR HELICOPTERS

[75] Inventor: Walter Koechner, Great Falls, Va.

[73] Assignee: Fibertek, Inc., Herndon, Va.

[21] Appl. No.: 154,026

[22] Filed: Feb. 9, 1988

[51] Int. Cl.⁴ ............................................. G01C 3/08
[52] U.S. Cl. ..................................... 356/5; 180/169; 356/152
[58] Field of Search ........................... 356/1, 4, 5, 152

[56] References Cited

U.S. PATENT DOCUMENTS

| | | | |
|---|---|---|---|
| 3,484,167 | 12/1969 | Burns | 356/5 |
| 3,610,821 | 10/1971 | Narbaits | 356/1 |
| 4,319,830 | 3/1982 | Roach | 355/1 |
| 4,572,662 | 2/1986 | Silverman | 356/5 |
| 4,632,543 | 12/1986 | Endo | 356/5 |
| 4,634,272 | 1/1987 | Endo | 356/5 |
| 4,678,328 | 7/1987 | Craig et al. | 356/141 |
| 4,716,298 | 12/1987 | Etoh | 356/5 |
| 4,716,431 | 12/1987 | Shindo | 356/4 |
| 4,721,385 | 1/1988 | Jelalian et al. | 356/5 |
| 4,748,469 | 5/1988 | Tamura | 356/1 |

Primary Examiner—Stephen C. Buczinski
Attorney, Agent, or Firm—Herman J. Hohauser

[57] ABSTRACT

An improved wire detection and avoidance system for helicopters is characterized by the use of a solid state laser transmitter which emits radiation in the near infrared wavelength region. Using either a beam dividing device or a plurality of laser diode arrays, separate laser beam lobes are generated which are passed through optical lenses for deflection in slightly different directions to define a field of coverage. A wire obstacle in the field of coverage intercepts one or more of the lobes and reflects return signals thereof to a receiver detector array. The return signals are compared with the transmitted laser lobes, with the difference therebetween being a function of the range between the obstacle and the helicopter. The range information is displayed to the pilot who then takes evasive action to avoid striking the obstacle.

15 Claims, 3 Drawing Sheets

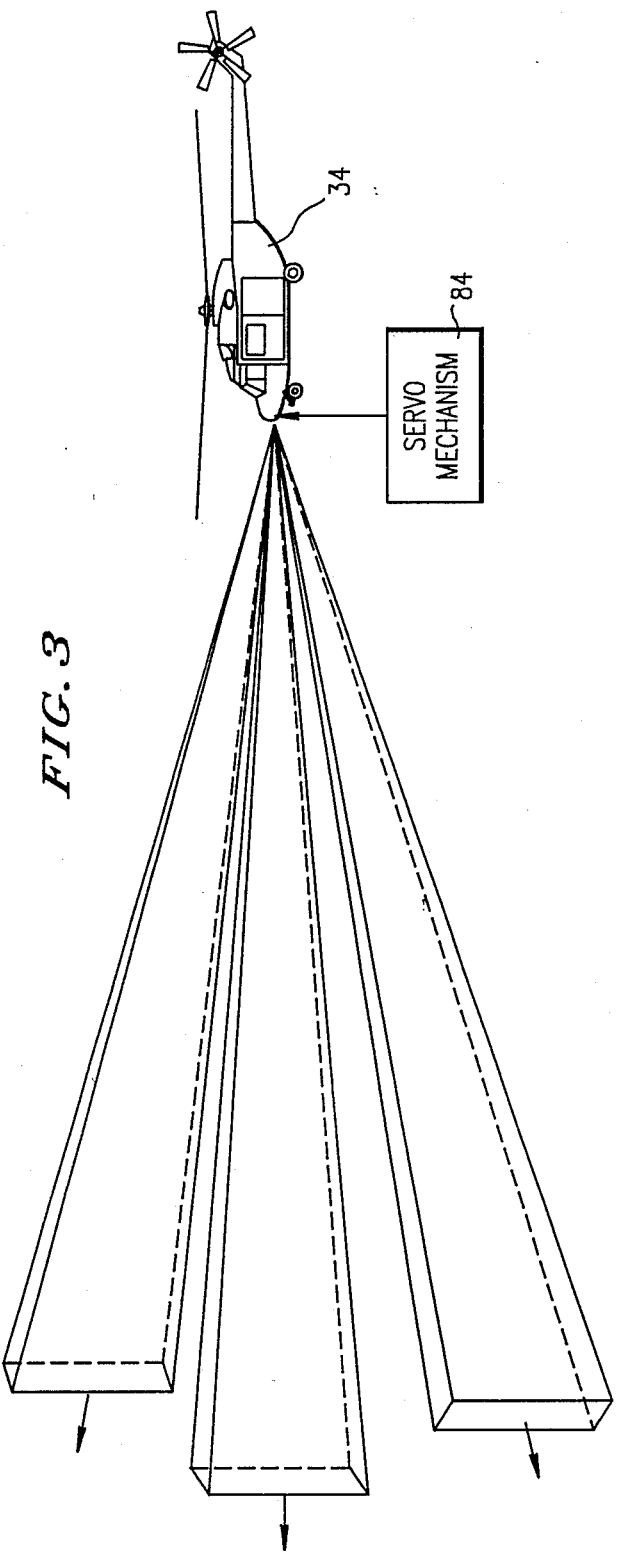
FIG. 3
FIG. 4C
FIG. 4B
FIG. 4A

WIRE OBSTACLE AVOIDANCE SYSTEM FOR HELICOPTERS

BACKGROUND OF THE INVENTION

The problem of helicopter wirestrikes has existed for many years and has been costly in terms of military hardware and human lives. Loss of helicopters and crew due to strikes against obstacles such as pylons, radio masts and cables is a very serious problem, since actual missions, training exercises and maneuvers of helicopters call for flight profiles below 100 meters and in most cases at or below tree top level. In particular, profiles for combat, search, and rescue missions of military helicopters demand high speed flight at low altitude for operation below the radar horizon. These helicopters make maximum use of terrain masking to avoid detection. Obstacle avoidance during daylight operation is mainly by visual observation and at night by means of night vision goggles and thermal imaging systems.

Power transmission lines and overhead cables and wires, which represent the smallest obstacles, are not detectable by conventional microwave radar owing to their small size, and the specular nature of the return signal at the microwave frequencies. Thermal imaging systems are also inadequate since wires are often at the same temperature as the background or are below the resolution limit of these systems. Accident statistics indicate that the high damage incidents and hence high cost are attributable to collisions with power cables since these are the strongest of all cables.

BRIEF DESCRIPTION OF THE PRIOR ART

A considerable effort has been devoted to solving the particular problem of wire strikes by low flying helicoptors. Prior techniques which have been tried include the use of microwave and millimeter wave radar systems, a far infrared based radar system (employing a carbon dioxide laser) and a passive system which detects the magnetic flux from a live transmission line. Each of the prior techniques has certain inherent drawbacks which make them unsatisfactory for wire detection.

The microwave and millimeter wave radar systems are characterized by long wavelengths. Due to the long wavelength and the specular reflection of metal surfaces at these wavelengths, wires and cables are particularly difficult to detect. Furthermore, emission from microwave and millimeter radar transmitters is propagated over large distances and over a broad area. This lack of covertness is a major handicap because combat helicopters must minimize RF emission to avoid detection.

It has been demonstrated that a carbon dioxide laser radar which operates in the far-infrared region at a wavelength of 10.6 $\mu$m is capable of detecting small obstacles. The major components of a carbon dioxide laser radar are: (a) a laser source which transmits a stream of pulses which are scanned across the field of view of the system with the radiation which intercepts an object such as a cable being reflected back into the system; (b) a cryogenically cooled laser detector for the detection of the reflected laser pulses; and (c) a scanning mirror system which deflects the transmitted laser pulses over a large field of view. Although a carbon dioxide laser radar has been demonstrated to be able to detect wires and the like, it has not found application in the current fleet of helicopters due to its large size, weight and complexity. The major components which make carbon dioxide laser radar cumbersome to use are the size of the laser and the beam scanning mechanism and the need for cryogenic cooling of the detector.

Finally, the magnetic flux detection system is useful only within ranges too short for obstacle avoidance. Furthermore, cables purposely employed across valleys and the like to intercept helicopters can not be detected using magnetic flux systems.

Thus no warning system with enough resolution to detect wires, power cables, guy ropes, towers, chimneys, trees and the like currently exists for helicoptors. The present invention was developed in order to provide a compact, lightweight wire detection and avoidance system having high resolution utilizing solid state radar transmission in the near infrared wavelength region.

SUMMARY OF THE INVENTION

Accordingly, it is a primary object of the present invention to provide an obstacle detection and avoidance system for helicopters including a solid state laser transmitter for generating a laser beam in the near infrared wavelength region (0.8 to 1.6 $\mu$m. A beam splitter or a prismatic lens is arranged at the output of the laser transmitter to divide the beam into a plurality of stationary lobes each of which extends in a slightly different direction to define the field of coverage of the transmitter. The laser beam lobes are intercepted by an obstacle at several locations. The obstacle, which may comprise a wire, a cable, or the like reflects return signals to a receiver. The receiver, which preferably comprises an array of avalanche detectors each connected with an optical fiber, receives the return signals and a signal processor connected with the receiver compares the return signals with the transmitted laser beam to indicate the presence and range of the obstacle.

The laser transmitter and beam splitter device are arranged in an assembly which is connected with a servo system for altering the direction of transmission of the laser beam lobes in response to changes in the direction of travel of the helicopter.

According to another object of the invention, the laser transmitter preferably comprises an array of laser diodes operating in the eye-safe wavelength region around 1.5 $\mu$m.

In one embodiment, the signal processor includes a range counter device connected with the laser transmitter and with the receiver for measuring the time difference between transmission of the laser beam and receipt of the return signals. The time difference is a function of the range of the obstacle relative to the helicopter. The output of the range counter is delivered to an alarm and range display device, whereby the helicopter pilot may take evasive action.

In an alternate embodiment, a modulation device is connected with the laser transmitter for modulating the laser beam, and the signal processor includes a phase comparator connected with the laser transmitter and with the receiver for comparing the phase difference between the transmitted laser beam and the return signals. The phase difference is a function of the range of the obstacle relative to the helicopter. As in the first embodiment, the output of the comparator is delivered to an alarm and range display device.

BRIEF DESCRIPTION OF THE FIGURES

Other objects and advantages of the subject invention will become apparent from a study of the following specification when viewed in the light of the accompanying drawing, in which:

FIG. 3 is a schematic illustration of the laser beam lobes transmitted from a helicopter in accordance with the invention; and FIGS. 4a, 4b, and 4c are schematic representations of three different types of laser beam patterns which may be generated by the system according to the invention.

DETAILED DESCRIPTION

Figure 1:
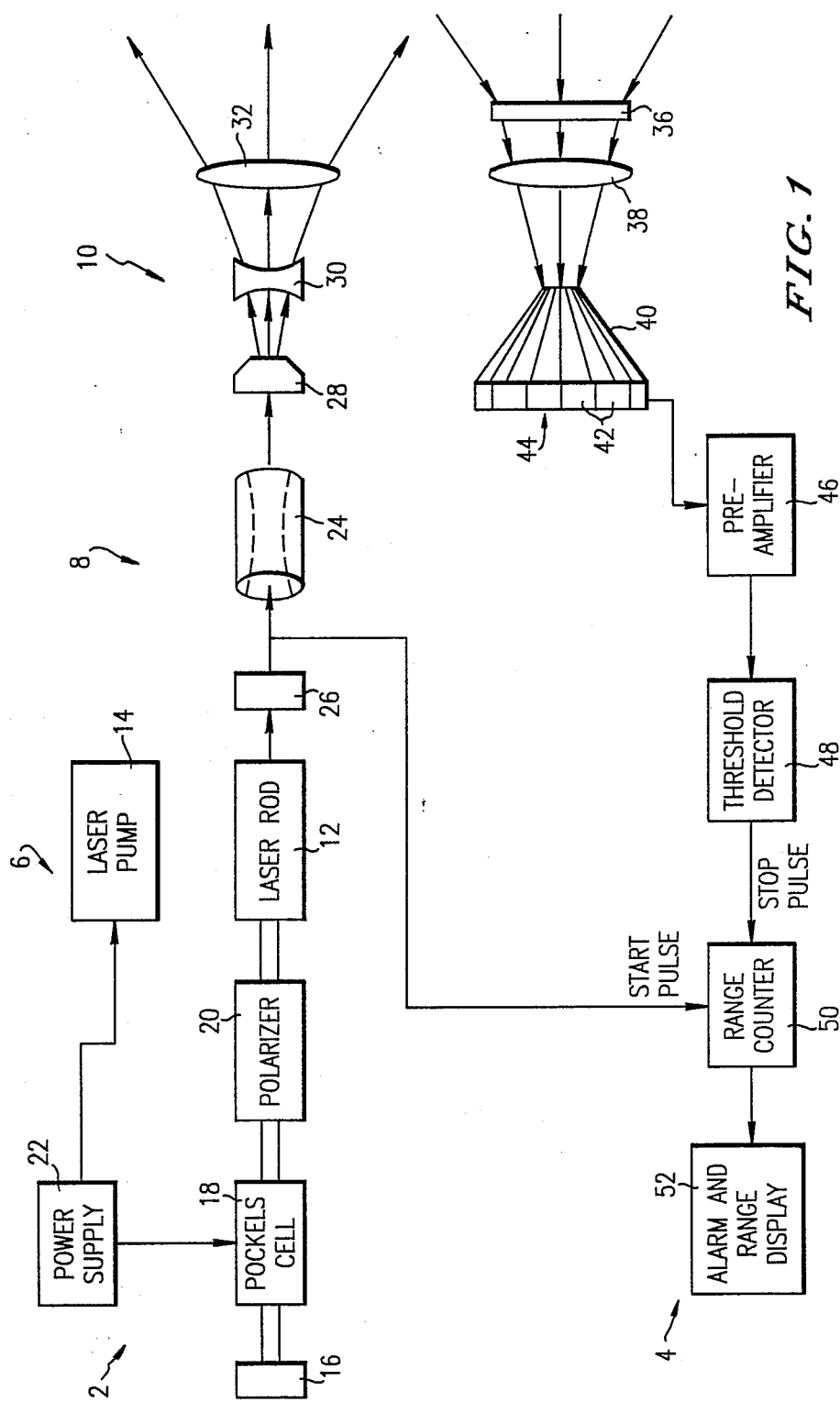
FIG. 1 is a block diagram of a first embodiment of the wire detection and avoidance system according to the invention.

Referring first to the embodiment of FIG. 1, the wire obstacle detection and avoidance system for helicopters includes a transmitter 2 and receiver 4. The transmitter comprises three sections, namely a solid state laser transmitter section 6, a wavelength conversion section 8, and an optical assembly 10. The laser transmitter includes a laser rod 12 such as a neodymium laser which emits a laser beam at a wavelength of 1.06 $\mu$m. A laser pumping device 14, which may comprise a plurality of flashlamps or laser diode arrays, pumps the laser for higher efficiency. As is conventional in a laser transmitter, a rear mirror 16, a pockets cell 18, and a polarizer 20 are provided in series to enhance the laser output, and a power supply 22 drives the detection and avoidance system.

A characterizing feature of the invention is that the solid state laser emits radiation having a wavelength in the near infrared region (0.8 to 1.6 $\mu$m). Since it is desirable to operate the laser in the eye-safe region around 1.5 $\mu$m, a wavelength converter such as a Raman cell 24 is provided at the output of the output mirror 26 of the laser transmitter section 6. The Raman cell, which is filled with hydrogen or methane, shifts the wavelength of the neodymium laser from 1.06 $\mu$m to longer wavelengths on the order of 1.5 $\mu$m in the eye-safe region. Alternatively, lasers, such as erbium doped lasers, which already emit at the eye-safe wavelength of 1.55 $\mu$m may be employed.

The single beam output from the wavelength conversion section is delivered to the optical section 8 where the beam is divided and focussed into a plurality of lobes extending in slightly different directions. More particularly, a beam splitting device 28 is arranged at the output of the Raman cell 24 to divide the beam into several lobes and concave and convex lenses 30, 32 direct the lobes in slightly different directions as shown in FIG. 3 to define a field of coverage for the system. In lieu of the beam splitter, a prism may be provided to divide the beam into a plurality of lobes.

Depending on the size and orientation of the lenses 30, 32, various lobe configurations may be defined as shown in FIGS. 4a–4c, and as will be developed in greater detail below.

A wire or other elongated obstacle which traverses the field of coverage of the lobes transmitted from the helicopter 34 (FIG. 3) intercepts the lobes at various locations on the obstacle to produce a return signal for each lobe intercepted. The return signals are received by the system receiver 4 mounted on the helicopter.

More particularly, a filter 36 is provided at the receiver input to suppress background radiation and to pass only laser radiation embodied in the return signals from the obstacle. A lens 38 collects the returned signals which are individually transmitted via the fibers of an optical fiber bundle 40 to the detectors 42 of a detector array 44. A plurality of detectors are provided in the receiver instead of a single detector to increase the signal to noise ratio. The signal to noise ratio of the system is determined by the ratio of the area suspended by the wire obstacle divided by the projected beam area (i.e. the field of coverage) at the intercept range. Therefore, subdividing the beam area by a multitude of detectors increases the signal to noise ratio. Physical separation of the input to each detector via an optical fiber enables very sensitive avalanche diodes to be used in the detector array.

Connected with the detector array 44 are the pulse ranging electronics including a preamplifier 46, a threshold detector 48, and a digital range counter 50. The counter receives a start pulse from the laser transmitter section 6 and a stop pulse from the threshold detector of the receiver corresponding with transmission and reception of the laser lobes and return signals, respectively. The time difference between the start and stop pulses is a function of the range of the obstacle. The output from the range counter is delivered to an alarm and range display device 52. Accordingly, when a return signal is received by the receiver, an alarm such as a warning light or buzzer alerts the helicopter pilot to an obstacle in front of his aircraft, and a display indicates the range of the obstacle relative to the helicopter.

Figure 2:
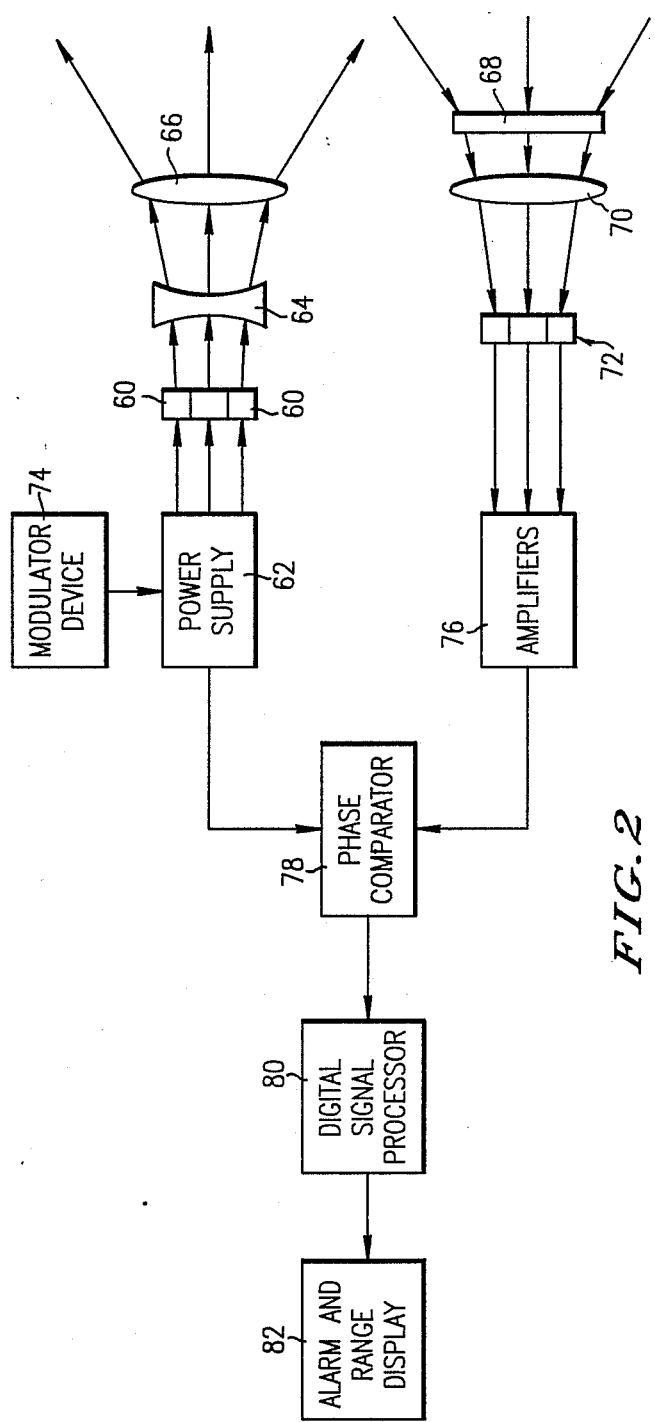
FIG. 2 is a block diagram of a second embodiment of the invention.

An alternate embodiment of the wire obstacle detection and avoidance system according to the invention is shown in FIG. 2. Instead of splitting the laser beam from a single laser as in the embodiment of FIG. 1, several diode laser arrays 60 are provided, each one generating a separate laser beam lobe, and being driven by a power supply 62. An optical assembly comprising a concave lens 64 and convex lens 66 alter the direction of and focus the individual lobes to define the field of coverage of the device.

Return signals reflected from the obstacle which intercepts the transmitted lobes at various locations pass through a filter 68 to remove background noise and a collecting lens 70 to an avalanche silicon detector array 72. Alternatively, a photomultiplier tube detector may be provided. One detector of the array is provided for detection of the return signal from each transmitted beam lobe.

A modulator device 74 is connected with the laser diode arrays which are operated in a continuous mode and which are amplitude modulated by the RF modulator device 74 at a frequency between 100 KHz and 1 MHz. The return signals are amplified by an amplifier 76 and delivered to a phase comparator 78 which compares the phase between the modulated transmitted and received signals. The phase difference corresponds with the range of the obstacle relative to the helicopter, whereby range distance may be evaluated to within a fractional modulation wavelength. The output from the phase comparator is digitally processed by a conventional signal processor, the output of which is delivered to an alarm and range display device 82.

The laser diode arrays 60 are preferably made from gallium aluminum arsenide capable of 10W continuous wave output. The lenses 64 and 66 or other beam optics (not shown) shape the output lobes into fan-shaped configurations oriented vertically (FIG. 4a), or slanted (FIG. 4b) or crossed (FIG. 4c) to cover the area in front of the aircraft. Laser diode arrays based on gallium arsenide or gallium aluminum arsenide are commercially available, highly reliable, rugged, and have a long life capability. The output wavelength is in the region of 800 to 900 nanometers. Of course, it is desirable from an eye-safe point of view to use laser diodes which emit at 1.5 μm.

One of the biggest problems in designing a laser based wire avoidance system is the provision for wide area coverage required as a result of the maneuverability of helicopters. If the laser beam is spread out over a large area, the beam intensity striking the wire is too low to produce a measurable return signal. The present invention solves this problem in two ways. First, the beam is subdivided into three or more lobes as opposed to using a large single solid beam. Second, the entire obstacle avoidance system is mounted on a small servo platform which is operable to swing the system into the direction of the flight vector in case of a sudden change in direction of the helicopter.

As set forth above, the division of a near infrared laser beam into several lobes is readily accomplished with the solid state lasers according to the invention. Such a division is not possible with the far-infrared laser. It is desirable to obtain a large field of coverage and still have sufficient beam intensity to obtain a return over useful ranges. Several examples of beam patterns afforded by the invention which provide a wide enough field of coverage in the forward direction for a safe flight profile are shown in FIGS. 4a–4c. An arrangement of vertical beam patterns as shown in FIG. 4a is preferred for detection of wires. However, vertical obstacles such as towers, chimneys, and the like may go undetected if they fall between the beam loads. Accordingly, for detection of vertical targets, the slanted beam arrangement of FIG. 4b is preferred.

A major drawback of fixed obstacle avoidance systems used on helicopters is that the field of coverage is not large enough to account for the maneuverability of the helicopter. For example, a detection system directed forward and mounted along the axis of the aircraft will not detect obstacles entering the flight path upon sharp banking or lateral maneuvering of the helicopter. Particularly critical is a flight path parallel to a power transmission line altered by a sudden turn into the direction of the obstacle.

Accordingly, a servo mechanism 84 including a gimbal mounted wire detection and avoidance system is provided as shown schematically in FIG. 3. The servo mechanism receives an input, such as from an accelerometer, in response to a change in direction of the helicopter and then turns the detection system in the direction of the new flight vector, whereby the laser lobes always define a field of coverage in the flight path of the helicopter.

The solid state near infrared laser wire detection and avoidance system is far more compact and light than the carbon dioxide based far-infrared systems. The combination of beam patterns and servo gimbal mounting also provides a much larger field of coverage. Since the system can be configured to operate in the eye-safe region, potential eye hazards are avoided.

While in accordance with the provisions of the patent statute the preferred forms and embodiments of the invention have been illustrated and described, it will be apparent to those of ordinary skill in the art that various changes and modifications may be made without deviating from the inventive concepts set forth above.

What is claimed is:

1. An obstacle detection and avoidance system for helicopters, comprising
   (a) solid state laser transmitter means for generating at least one laser beam in the near infrared wavelength region;
   (b) means for dividing said laser beam into a plurality of lobes and for directing said lobes in different directions to define a field of coverage, said laser beam lobes being intercepted by an obstacle in the field of coverage at various locations thereof, said intercepted beam lobes being reflected from the obstacle as return signals;
   (c) means for receiving and detecting said return signals; and
   (d) means connected with said receiving means and with said laser transmitter means for comparing said return signals with said transmitted laser beam lobes, the difference being a function of the range of the obstacle relative to the helicopter;
   (e) and further comprising a directional control servo mechanism for altering the directions of transmission of said plurality of lobes, whereby the field of coverage defined by said generated laser beam lobes may be changed in accordance with a change in the direction of travel of the helicopter.

2. Apparatus as defined in claim 1, wherein said receiving means includes
   (a) filter means for suppressing background radiation from said return signal;
   (b) lens means arranged adjacent said filter means for collecting said return signals; and
   (c) detector means connected with said lens means for detecting said return signals.

3. Apparatus as defined in claim 2, and further comprising means connected with said comparing means for providing an alarm in response to said return signals and for providing a display of the range of the obstacle relative to the helicopter.

4. Apparatus as defined in claim 3, wherein said detector means comprises an array of avalanche detectors and a bundle of optical fibers, each of said fibers being connected with one of said detectors, whereby each detector covers a small field of view and further whereby the return signals from the obstacle are maximized.

5. Apparatus as defined in claim 4, wherein said laser means comprises an erbium doped laser which emits a beam having a wavelength of approximately 1.55 μm.

6. Apparatus as defined in claim 4, wherein said laser means comprises a neodymium laser which emits a beam having a wavelength of approximately 1.06 μm.

7. Apparatus as defined in claim 6, and further comprising wave length shifter means arranged between said neodymium laser and said beam to a longer wavelength within the near infrared region.

8. Apparatus as defined in claim 4, wherein said beam dividing means comprises a beam splitter and lens means for directing said lobes in different directions.

9. Apparatus as defined in claim 4, wherein said beam dividing means comprises at least one beam deflection means and lens means for directing said lobes in different directions.

10. Apparatus as defined in claim 4, wherein said comparing means includes (a) a threshold detector for sensing return signals above a given threshold; and (b) range counter means connected with said laser means and with said threshold detector for measuring the time difference between transmission of said laser beam and receipt of said return signals, said time difference being a function of the range of the obstacle relative to the helicopter.

11. Apparatus as defined in claim 3, wherein said beam dividing means comprises a plurality of laser diode arrays each of which generates a single laser beam lobe.

12. Apparatus as defined in claim 11, and further comprising modulator means connected with said laser means for modulating said laser diode arrays.

13. Apparatus as defined in claim 12, wherein said comparing means comprises a phase comparator connected with said laser means and said receiving means for comparing the phase difference between said transmitted laser beam and said return signals, said phase difference being a function of the range of the obstacle relative to the helicopter.

14. Apparatus as defined in claim 13, wherein said laser diode arrays are formed of gallium arsenide lasers.

15. Apparatus as defined in claim 13, wherein said laser diode arrays are formed of gallium aluminum arsenide lasers.

* * * * *